Feb. 3, 1970
R. L. SETHER
3,493,789
PULSE RESETTABLE DEVICE FOR PROVIDING A DELAYED OUTPUT AFTER THE CESSATION OF A SERIES OF SPACED INPUTS
Filed June 28, 1966
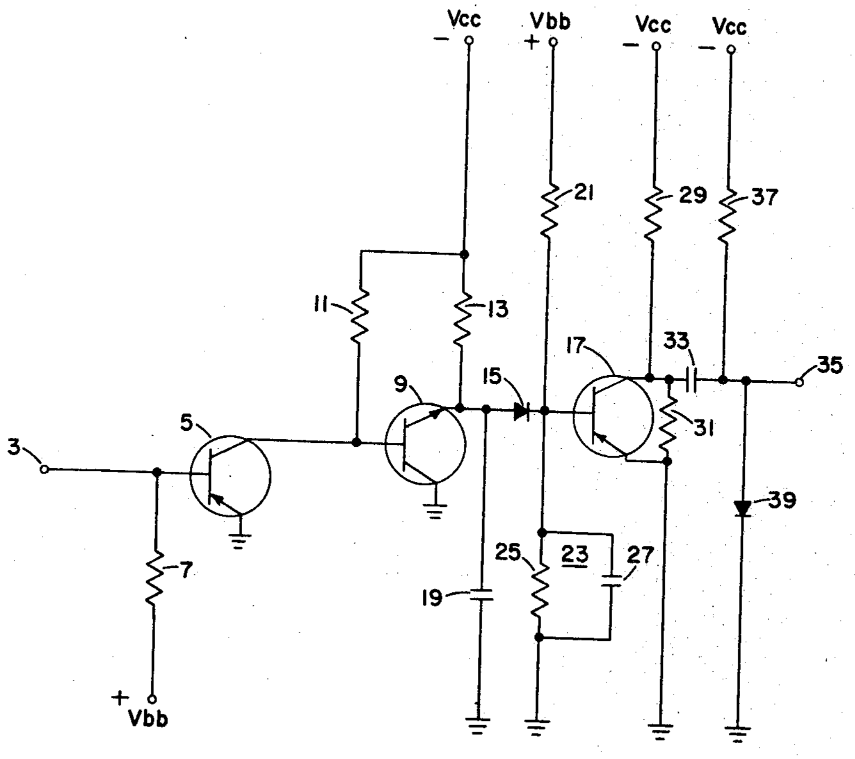
Richard L. Sether,
INVENTOR.
BY Harry M. Saragovitz
Edward J. Kelly
Herbert Berl
Jack H. Voigt

United States Patent Office 3,493,789
Patented Feb. 3, 1970

3,493,789

PULSE RESETTABLE DEVICE FOR PROVIDING A DELAYED OUTPUT AFTER THE CESSATION OF A SERIES OF SPACED INPUTS

Richard L. Sether, St. Paul, Minn., assignor, by mesne assignments, to the United States of America as represented by the Secretary of the Army Filed June 28, 1966, Ser. No. 562,436
Int. Cl. H03k *17/26*
U.S. Cl. 307—293 3 Claims

ABSTRACT OF THE DISCLOSURE

Routinely spaced input pulses cause a capacitor to be repeatedly discharged. The absence of input pulses permits the capacitor to charge to a level sufficient to cause a Zener diode to conduct and conductively bias a transistor having a differentiated output to provide a delayed output.

This invention relates generally to timing circuits and more specifically to a timing circuit which provides an electrical output signal pulse at a fixed time after a series of electrical input pulses.

In computer circuits, timing circuits, and control circuits, there is a need for a delay to provide an electrical output signal at a fixed time after the last of a series of uniformly-spaced electrical input pulses have been processed.

Therefore, the present invention is a resettable delay circuit which provides an accurate measure of time by using transistors and a Zener diode in addition to an RC network. The Zener diode provides an accurate voltage measuring device while the correlation between voltage and time is done with an RC network.

It is, therefore, an object of this invention to provide a resettable delay which provides an electrical output signal at a fixed time after the last of a series of uniformly-spaced electrical input pulses.

Another object of this invention is to provide a device which gives an accurate measure of time for computer operations.

Further, it is an object of this invention to provide a novel resettable delay circuit which is simple and easy to maintain.

Other objects and many of the attendant advantages of this invention will be readily appreciated as the same becomes better understood by reference to the following detailed description when considered in connection with the accompanying drawing wherein the single figure is a schematic diagram of a resettable delay circuit according to the present invention.

Referring now to the drawing, the invention consists of a first transistor 5 having its base lead conected as the input to the circuit at terminal 3 and a base bias voltage $V_{bb}$ connected to the base through a biasing resistor 7. The emitter of transistor 5 is connected to ground potential while the collector is connected to the base of a second transistor 9. A voltage source $V_{cc}$ is connected to the base of transistor 9 through biasing resistor 11 and to the emitter of transistor 9 through resistor 13 while the collector of transistor 9 is connected to ground potential. The emitter of transistor 9 is further connected through a Zener diode 15 to the base of a third transistor 17. The emitter of transistor 9 is connected to ground potential through a capacitor 19. The base of transistor 17 is connected to $V_{bb}$ through resistor 21 and to ground potential through an RC network 23 consisting of a resistor 25 connected in parallel with a capacitor 27. The collector of transistor 17 is connected to $V_{cc}$ through resistor 29 and to ground potential through resistor 31 while the emitter of transistor 17 is connected direclty to ground potential. The output of the circuit is taken at the collector of transistor 17 and coupled through a differentiating capacitor 33 to output terminal 35. Output terminal 35 is connected to $V_{cc}$ through resistor 37 and to ground potential through diode 39.

IN OPERATION

Inputs to this circuit are negative-going pulses which drive transistors 5 and 9 into saturation. Capacitor 19 discharges through transistor 9 each time an input pulse is received. If the circuit is not reset by an input pulse to the base of transistor 5, capacitor 19 charges toward the negative supply voltage $V_{cc}$. When the charge across capacitor 19 reaches the Zener breakdown potential, transistor 17 saturates quickly due to the voltage spike effect of RC network 23. The output of transistor 17 is differentiated by capacitor 33 to give a positive-going pulse indicating the end of a series of uniformly spaced pulses. Diode 39 provides a discharge path for capacitor 33 upon saturation of transistor 17.

While the invention has been described with reference to a preferred embodiment thereof, it will be apparent that various modifications and other embodiments thereof will occur to those skilled in the art within the scope of the invention. Accordingly, it is desired that the scope of this invention be limited only by the appended claims.

What is claimed is:

1. A resettable delay circuit for generating an output pulse indicative of the cessation of a series of pulses applied to an input thereof comprising: a first electron device having an input and an output, said input of said first electron device being connected to said input of said delay circuit; a second electron device having an input and an output, said input of said second electron device being connected to said output of said first electron device; a resettable delay means having an input connected to said output of said second electron device for delaying said output pulse a predetermined time upon cessation of said series of applied pulses; a third electron device being connected to an output of said delay means; a differentiating means connected between said output of said third electron device and the output of said delay circuit for providing a pulse responsive to the output of said third electron device; said first, second, and third electron devices being first, second and third transistors respectively having base, emitter and collector electrodes, said base electrode of each of said transistors being connected as said input to said electron devices, said first and third transistors having said emitter electrodes connected to ground potential and said collectors connected as said outputs of said electron devices, said second transistor having said collector electrode connected to ground potential and said emitter electrode connected as said output of said electron device; said delay means comprising a capacitor connected between said emitter electrode of said second transistor and ground potential and a Zener diode connected between said emitter electrode of said second transistor and said base electrode of said third transistor whereby upon cessation of said series of input pulses, said capacitor is charged to a voltage sufficient to cause conduction through said Zener diode and saturation of said third transistor.

2. A resettable delay circuit as set forth in claim 1 further comprising an RC network connected between said base electrode of said third transistor and ground potential for faster saturation of said third transistor upon conduction of said Zener diode.

3. A resettable delay circuit as set forth in claim 1, wherein said differentiating means comprises a differentiating capacitor connected in series with said output of said third electron device, a resistor connected between said output of said third electron device and ground potential and a diode connected between said output of said delay circuit and ground potential for providing a discharge path for said differentiating capacitor.

References Cited

UNITED STATES PATENTS

| | | | |
|---|---|---|---|
| 2,719,226 | 9/1955 | Gordon, et al. | 328—120 X |
| 3,063,017 | 11/1962 | Lehan, et al. | 328—55 |
| 3,174,055 | 3/1965 | Clapper | 307—229 |
| 3,289,010 | 11/1966 | Bacon, et al. | 307—318 X |

JOHN S. HEYMAN, Primary Examiner

R. C. WOODBRIDGE, Assistant Examiner

U.S. Cl. X.R.

307—313, 318; 328—120, 140